United States Patent
Cliff et al.

(10) Patent No.: US 8,023,171 B2
(45) Date of Patent: Sep. 20, 2011

(54) DEVICES CONTAINING COMPOSITIONS COMPRISING CATHODICALLY COLORING ELECTROCHROMIC POLYMERS AND BINDER POLYMERS

(75) Inventors: Nancy Nase Cliff, Ringwood, NJ (US); David Yale, Bethel, CT (US); Jennifer Jankauskas, Putnam Valley, NY (US); Ece Unur, Bursa (TR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/749,584

(22) Filed: Mar. 30, 2010

(65) Prior Publication Data

US 2010/0253994 A1    Oct. 7, 2010

Related U.S. Application Data

(60) Provisional application No. 61/166,331, filed on Apr. 3, 2009.

(51) Int. Cl.
*G02F 1/153* (2006.01)
*G02F 1/03* (2006.01)
(52) U.S. Cl. .................... 359/273; 359/247; 359/253
(58) Field of Classification Search .................. 359/288, 359/265–277, 245, 247, 254, 242, 240, 250–253, 359/315, 318, 321; 345/49, 105; 348/817; 250/70; 438/929

See application file for complete search history.

(56) References Cited

U.S. PATENT DOCUMENTS

| | | |
|---|---|---|
| 4,697,000 A | 9/1987 | Witucki |
| 4,902,108 A | 2/1990 | Byker |
| 5,446,577 A | 8/1995 | Bennett et al. |
| 5,995,273 A | 11/1999 | Chandrasekhar |
| 6,178,034 B1 | 1/2001 | Allemand et al. |
| 6,791,738 B2 | 9/2004 | Reynolds et al. |
| 2002/0126365 A1* | 9/2002 | Armgarth et al. ............ 359/265 |
| 2004/0061097 A1* | 4/2004 | Kloeppner et al. ........... 252/583 |
| 2005/0237594 A1* | 10/2005 | Ho et al. ..................... 359/265 |
| 2010/0298527 A1 | 11/2010 | Beaujuge ..................... 528/380 |
| 2011/0046330 A1 | 2/2011 | Beaujuge ..................... 526/335 |

* cited by examiner

*Primary Examiner* — Dawayne A Pinkney
(74) *Attorney, Agent, or Firm* — Qi Zhuo

(57) ABSTRACT

Electrically active, cathodically coloring electrochromic polymers are blended with a non-electrochromic, non-electrically conductive binder polymer to provide an electrochomic composition with greatly enhanced performance in an electrochromic device over time. It is also found that blending an electrochromic polymer with a non-coloring electroactive material allows for greater design in preparing electrochromic devices as it enables the use of a higher amount of typically low coloring anodic materials due to increased need for charge balancing.

15 Claims, No Drawings

DEVICES CONTAINING COMPOSITIONS COMPRISING CATHODICALLY COLORING ELECTROCHROMIC POLYMERS AND BINDER POLYMERS

This application claims benefit under 35 USC 119(e) of U.S. provisional application No. 61/166,331, filed Apr. 3, 2009, the disclosure of which is incorporated herein in its entirety by reference.

Cathodically coloring compositions exhibiting improved color characteristics and durability, and electrochromic devices comprising the compositions, are provided, which compositions comprise a cathodically coloring polymer, such as a thiophene polymer or copolymer, and a non-electrically conductive binder polymer, such as an acrylate, polyester etc. The compositions exhibit improved physical properties, including greater adhesion to electrodes and other surfaces, and enhanced retention of electroactive properties, including response to applied electric potential and electrochromic activity.

BACKGROUND

Electroactive polymers continue to attract attention due to their promising applications as functional materials for light-emitting diodes, electrochromic devices, field effect transistors, photovoltaic devices, batteries, antistats etc. One important class of inherently conductive or electroactive polymers are electrochromic polymers.

Electrochromic devices are well known, e.g., U.S. Pat. Nos. 4,902,108 and 6,178,034, incorporated herein in their entirety by reference. Such devices undergo a change in electromagnetic radiation transmission upon application of an electrical stimulus and have found use in a number of commercial applications. For example, they may be employed in glazings, e.g., energy efficient and privacy windows for architectural or automotive use, automotive rearview mirrors, displays, filters, eyewear including goggles, antidazzle and fog penetrating devices, and other applications where variable light transmission is desired.

Electrochromic devices are typically associated with a noticeable change in color. Changes in other optical properties, such as in the degree of clarity and opacity and absorption in the IR, are also characteristics of such devices.

In electrochromic materials, electrochemical oxidation or reduction induces a reversible change in the reflected or transmitted light. Electrochromic materials have proved especially useful in the construction of mirrors, displays, windows etc where the transparency or color of the article is altered by applying or altering an electrical voltage. Commercial devices include rear view mirrors that darken at night to prevent glare from headlights, or windows that darken to reduce transmitted sunlight or to provide privacy.

Many electrochromic devices have been produced using inorganic compounds like tungsten trioxide and iridium dioxide, but organic compounds, such as organic conducting polymers, continue to find increasing use as electrochromic materials. Among the advantages organic materials offer is that organic materials can more easily be fashioned into flexible devices such as would be used in electronic paper or other such applications.

Electrochromic materials include compounds that change from one color to another with applied voltage as well as compounds that change from transparent or clear to opaque or colored. The change from clear to colored can occur when a material is electrochemically oxidized, anodically coloring, or when the material is electrochemically reduced, cathodically coloring. The reverse reaction, for example back to clear, should occur when the electrical impulse is removed or reversed.

The fact that a cathodically coloring material changes from colorless to colored, or lightly colored to darkly colored, when reduced, does not mean that the material is colorless when in the neutral state. In many cases, such as with many thiophene polymers, the materials are clear when in a stable oxidized state, e.g., a cationic state formed in the presence of a polysulfonic acid, and becomes colored when the cationic material is reduced to the neutral state. More than one color may be formed depending on the applied voltage and "colorless" is a relative term, some small amount of color may be present in the colorless state with many electrochromic materials.

U.S. Pat. No. 6,791,738, incorporated herein in its entirety by reference, provides electrochromic polymers and devices. In particular, anodically coloring polymers having a band gap>3 eV in the neutral state and oxidation potential<0.5 vs a saturated calomel electrode, such as poly 3,4-dialkoxypyrroles, are provided.

Unless otherwise specified, when used herein "polymers" is a term including both co-polymers and homo-polymers.

U.S. Pat. No. 4,697,000 disclose the production of electronically conductive polypyrroles, which may be co-polymers of variously substituted pyrrole repeating units.

U.S. Pat. No. 5,446,577, incorporated herein in its entirety by reference, discloses display devices comprising a transparent outer layer, a first electrode, which is ion-permeable, having a reflective surface facing the transparent layer, an electrochromic material, preferably a conductive polymer such, as polyaniline, located between the reflective surface and the outer transparent layer, an electrolyte in contact with the electrochromic material and a second electrode located behind the first electrode. The display devices are capable of changing reflectance and/or color by the application of an electric potential to the electrodes.

U.S. Pat. No. 5,995,273, incorporated herein in its entirety by reference, discloses an electrochromic display device having an electrochromic conducting polymer layer in contact with a flexible outer layer; a conductive reflective layer disposed between the electrochromic conducting polymer and a substrate layer; and a liquid or solid electrolyte contacting the conductive reflective layer and a counter electrode in the device.

Inherently conductive materials based on organic polymers offer many advantages over metal or other inorganic materials in electrochromic devices. For example, polymers are often more readily processed providing improvements in device construction. Many conductive polymers are handled easily in air and can be molded or processed using conventional techniques well known in plastic and coating applications. Soluble polymers can be applied as a coating or via an ink jet or standard lithography process.

However, there are also potential disadvantages in using conductive polymers. Often, the polymer must remain in contact with an electrode or other surface. As with inks and coatings, adhesion to the surface must be attained and retained. Poor contact with, for example, an electrode, or subsequent delaminating will negatively impact or negate the desired electrochromic behavior. Further, many electrochromic applications place electrochromic polymer in the presence of electrolyte systems which may include aggressive solvents. The same solubility characteristics that allow a polymer to be applied as a coating may also result in a greater degree of polymer dissolution or delamination.

Many anodically coloring polymers face an additional problem in that the intensity or color strength of the colors that are formed upon voltage application or variation is not particularly strong, particularly when compared with the colors produced using cathodically coloring polymers. Copending application U.S. 61/125,689 incorporated herein in its entirety by reference, discloses an anodically coloring, electrochromic composition with improved color characteristics and durability, comprising an electrically active, anodically coloring polymer and a non-electrically conductive polymer. Surprisingly, it was found that the color of anodically color polymer can be enhanced by blending with non-conducting polymers.

Many cathodically coloring polymers are much more strongly coloring than anodically coloring polymers but still face significant challenges. For example, polymers that are easily processed because of good solubility are often more likely to delaminate from the electrode during use. Physical or chemical degradation may also occur resulting in reduced response to applied voltage seen in slower switching times, lower contrast ratios and device failure.

Any attempt to improve the performance of electrochromic polymers, for example, the adhesion or durability of the polymer, must not impact the characteristics of the polymer that make it valuable. For example, fast switching times, color space and sharp differentiation between the electrically oxidized or reduced forms of electrochromic materials can not suffer as a consequence of improved electrode adhesion or polymer durability.

It has been found that blending electrochromic, cathodically coloring polymers with non-electrically conducting binder polymers not only improves film forming properties, but also enhances performance after repeated switching, maintaining excellent switching times and color characteristics.

SUMMARY OF THE INVENTION

The invention provides an electroactive composition with enhanced properties, which composition comprises a cathodically coloring polymer and a non-conductive binder polymer, a method for preparing the composition, and electroactive devices, such as electrochromic devices, which comprise the composition. In one embodiment, the composition is an electrochromic layer of electroactive device. Electroactive layers of the invention are more durable than layers produced using only electroactive materials, but surprisingly maintain the same excellent color and switching speeds.

One advantage of the inventive composition is that durable electroactive, e.g., electrochromic, layers are produced from polymers which have excellent initial activity, but which do not, on their own, provide suitably durable layers. Thus compositions comprising the cathodically coloring polymers and binder polymers made in accordance with the invention allow greater flexibility and control regarding the color, brightness, contrast and environmental stability of, for example, an electrochromic window or display, and greatly expand the pallet of usable materials available to the designer of electroactive devices.

Also provided are transmissive or reflective electrochromic devices comprising the compositions. The invention also provides for the use of complementary, i.e., anodically and cathodically coloring, electrochromic polymers, in the manufacture of electrochromic devices. Because a device such as an electrochromic device requires balancing properties of the cathode with those of the anode and because cathodically coloring polymers often produce stronger colors than anodically coloring polymers, the impact of an anodically coloring polymer on the color of a device containing both an anodically and cathodically coloring polymer may be limited by the demands of charge balancing. That is, the amount of anodically coloring polymer required to balance the charge of the cathodically coloring polymer may result in an insignificant amount of color from the anodically coloring polymer compared with the color of the cathodically coloring polymer. In another embodiment of the invention, the cathodically coloring polymer is blended with a colorless or only slightly coloring electroactive polymer, for example a polynitroxide or other electroactive organic material, which then allows for use of larger amounts of anodically coloring polymer at the counter electrode which increases the amount of obtainable color.

DESCRIPTION OF THE INVENTION

Provided is a cathodically coloring electrochromic composition with excellent color characteristics and durability comprising an electrically active, cathodically coloring polymer and a non-electrically conductive binder polymer.

Also provided is a method for improving the performance of electrochromic cathodically coloring polymers, particularly in electrochromic devices, by blending the polymer with a non-conductive binder polymer. The method allows for the preparation of cathodically coloring polymer films with excellent physical properties and excellent response to applied voltage. The method is especially valuable for polymers that are highly soluble or otherwise prone to delamination or deterioration and thus expands the materials and color properties available for electrochromic devices.

An electrochromic device comprising as an electroactive color changing component a cathodically coloring, electrochromic composition with excellent color characteristics and durability, which composition comprises an electrochromic, cathodically coloring polymer and a non-electrically conductive binder polymer in a single layer is provided.

Also provided is an electrochromic device containing a cathodically coloring polymer associated with one electrode and an anodically coloring polymer associated with a counter electrode wherein the cathodically coloring polymer is blended with a non-coloring or lightly coloring electroactive polymer, with or without the binder polymer. The cathodically coloring polymer the anodically coloring polymer may each optionally be blended with non-conductive polymers.

The present invention thus expands the range of cathodically coloring electrochromic polymers useful in electrochromic devices by.

One embodiment of the invention relates to the expansion of the useful color space of cathodically coloring polymers obtained by preparing certain inventive compositions. Another embodiment relates to the enhanced color space and/or color strength observed after repeated switching of the device prepared using the inventive composition as compared with that observed after repeated switching of a device prepared using the cathodically coloring polymer alone instead of the blend.

While the production of durable, fast switching cathodically coloring films or layers according to the instant invention in itself expands the options and color space available by allowing for the use of otherwise non-robust polymers, another embodiment, blending a non coloring or lightly coloring electroactive polymer with a strongly coloring cathodically coloring polymer, expands the useful color space and provides improvements in contrast ratios of electrochromic devices by allowing, actually requiring, the use of a larger amount of anodically coloring electrochromic polymer at the counter electrode of a device containing both types of coloring polymers. This is due to the fact that there will be more charge at the cathode that will need to be balanced and therefore more of the anodically coloring polymer, often less strongly coloring than the cathodically coloring polymer, can be used. Therefore the contribution to the color from the anodically coloring polymer will become more significant and offer greater opportunities to blend colors.

The cathodically coloring polymers of the invention are, for example, polymers that change from being clear, colorless or nearly colorless to colored or more strongly colored upon being reduced by the application of an electrical voltage. The cathodically coloring polymers of the invention may also change from one color to another color upon further reduction by the application of increased voltage.

Often, the colorless or less colored state of the polymer is an oxidized polymer which can be produced by addition of chemical oxidizing agent or acid such as polyphenylene sulphonic acid, or an oxidized polymer can be produced by electrochemical oxidation typically in the presence of a charge balancing counter ion. In cases such as this, it is the neutral polymer that is the colored state. For example, the cathodically coloring polymers of the invention include polymers and copolymers comprising repeating units derived from thiophene, carbazole, phenylene vinylene, acetylene, aniline, phenylenediamine and pyrrole monomers and the like, which polymers become more highly colored upon being reduced by applied electrical voltage.

One particular embodiment of the invention relates to copolymers, for example, copolymers comprising thiophenes. While interesting coloristic properties can be produced using copolymers, many lack sufficient durability for use in a device. This may be due to increased solubility relative to some homo-polymers, or perhaps degradation becomes more problematic due to the electronic pr chemical differences of the co-monomers. Regardless of the reason, many copolymers with poor durability are greatly aided by blending with binder polymers according to the present invention.

In one embodiment of the invention, the cathodically coloring polymers are thiophene polymers and copolymers such as those comprising alkoxy- and dialkoxy substituted thiophenes. In one embodiment, the cathodically coloring polymer is a polymer or copolymer comprising in its backbone an alkoxy, dialkoxy or alkylenedioxy substituted thiophene. For example the cathodically coloring polymers may contain as a repeating unit a moiety of one or more of the following general formulae:

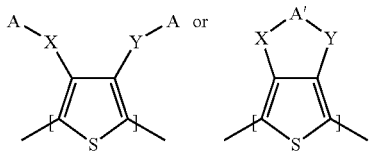

wherein X and Y are independently of each other an oxygen atom, sulfur atom or a group NR, typically X and Y are each oxygen, each R and each A is independently H, alkyl, interrupted and/or substituted alkyl and A' is alkylene or interrupted and/or substituted alkylene.

For example, "alkyl, interrupted and/or substituted alkyl" is unsubstituted alkyl; or alkyl interrupted by one or more ether, ester, amino or amido linkages, such as a polyether, e.g., propylene glycol or ethylene glycol; or alkyl or interrupted alkyl substituted by, for example, one or more of an aromatic or heteroaromatic ring, such as phenyl or substituted phenyl, OH, OAcyl, O-alkyl, amino, amido, CN, halogen, salts and other commonly occurring substituents; and A' is alkylene, for example $C_{1-12}$ alkylene, which may be interrupted and or substituted as for R or A.

For example, each R is independently a $C_{1-24}$ alkyl group which may be substituted and/or interrupted as above and each A is independently H or $C_{1-24}$ alkyl group which may be substituted and/or interrupted as above and A' is a $C_{1-12}$ alkylene group or $C_{1-6}$ alkylene group which may be substituted and or interrupted as above.

In one particular embodiment, X=Y=O,

R is $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt, each A is independently H, $C_{1-24}$ alkyl or alkyl interrupted by one or more oxygen atoms or carbonyl, ester, amino or amido linkages, which alkyl or interrupted alkyl may also be substituted one or more times by one or more aromatic or heterocyclic ring, OH, OAcyl, O-alkyl, amino, amido, CN, halogen, COOH, carboxylic ester, amino salt, carboxylate salt or phosphorous salt and A' is $C_{1-6}$alkylene or alkylene interrupted and/or substituted as for A.

Alkyl may be branched or unbranched alkyl and obviously $C_1$ alkyl or alkylene refers to a methyl or methylene group and is not interrupted but may be substituted.

Ester, amino or amido linkages represent interruptions in the alkyl chain by —COO—, —NH—N($C_{1-24}$alkyl)'- or —N(CO)— groups, OAcyl or O-alkyl substituents include ester or ether groups substituted by $C_{1-24}$ alkyl and amino or amido includes amine or amide groups substituted by H or $C_{1-24}$ alkyl.

In one embodiment, the cathodically coloring polymer is a polymer or copolymer comprising in its backbone in its backbone alkoxy, dialkoxy or alkylenedioxy substituted thiophene moieties plus moieties containing other heterocycles, examples of which are found in US Patent Application Publication Nos. 2010/0298527 and 2011/0046330 the disclosures of which are incorporated in their entirety by reference. Additional description of useful polymers can be found in, for example, Welsh, D. M.; Kumar, A.; Morvant, M. C.; Reynolds, J. R. Synth. Met. 1999, 102, 967; B.D. Reeves, C.R.G. Grenier, A.A. Argun, A. Cirpan, T.D. McCarley, J.R. Reynolds, Macromol 2004, 37, 7559-7569 and Reeves, B. D.; Unur, E.; Ananthakrishnan, N.; Reynolds, J. R. Macromolecules 2007, 40, 5344.

For example, the cathodically coloring polymer of the invention may be a conjugated polymer comprising a plurality of repeating units, the repeating units comprising a plurality of substituted dioxyheterocycle based donor groups coupled to an acceptor group, wherein the conjugated polymer absorbs radiation within a first band of the visible spectrum and a second band of the visible spectrum when in a neutral state and upon oxidation the polymer is transmissive with absorbance of radiation within the first and second bands being less than in the neutral state. Certain valuable polymers absorbs radiation within the first and second bands in the neutral state at an intensity of more than or equal to about 200% of the intensity in the neutral state.

The dioxyheterocycle, for example, is a dioxythiophene such as an alkylenedioxythiophene, such as a 3,4-propylenedioxythiophene.

The acceptor group for example is an electron poor aromatic unit which, for example, comprises a substituted or unsubstituted benzothiadiazole group, thiadiazoloquinoxaline group, quinoxaline group, thienothiadiazole group, thienopyrazine group, pyrazinoquinoxaline group, benzobisthiadiazole group or thiadiazolothienpyrazine group, for example the electron poor aromatic unit is a 2,1,3-benzothiadiazole group.

In one particular embodiment, the cathodically coloring polymer has a structure of formula II:

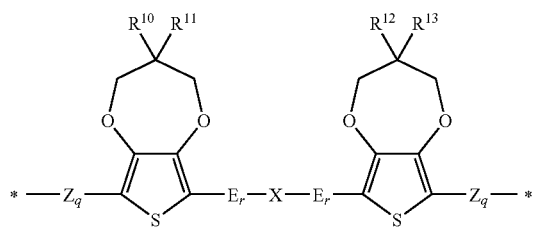

Wherein X is an electron poor aromatic unit, e.g., X comprises a substituted or unsubstituted benzothiadiazole, thiadiazoloquinoxaline, quinoxaline, thienothiadiazol, thienopyrazine, pyrazinoquinoxaline, benzobisthiadiazole or thiadiazolothienopyrazine moiety;

E is an electron rich conjugated unit, for example, a substituted or unsubstituted thiophene; Z is a conjugated unit, for example, a substituted or unsubstituted dioxythiophene;

q and r are 0, 1, 2 or 3, and $R^{10}$, $R^{11}$, $R^{12}$ and $R^{13}$ (are the same or different and often comprise a functional group chosen from oligoether, ester, amide, carboxylic acid, sulfonate, and amine and at least one of $R^{10}$, $R^{11}$, $R^{12}$ and $R^{13}$ comprises a linear or branched aliphatic carbon chain that optionally comprises one or more heteroatoms; in one embodiment $R^{10}$, $R^{11}$, $R^{12}$ and $R^{13}$ are —R'OR" groups, where R' is a methylene, ethylene or propylene group and R" is a linear or branched $C_2$ to $C_{30}$ alkyl.

More than one cathodically coloring polymer may be present.

The binder polymer is a non-electrically conductive organic polymer such as a thermoplastic, elastomeric or thermoset polymer which polymer may be crosslinked. Such polymers are well known, common items of commerce and can be found for example in copending U.S. application Ser. No. 11/978,764, the relevant portions of which are incorporated herein by reference.

Typically, the binder polymer is a "coating polymer", that is, a polymer typically encountered as part of a coating system or paint, such as coatings for automobiles, appliances, wood, plastic articles, paper, glass etc.

The binder polymer can in principle be any binder customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, acrylamide, polyester, styrenic, phenolic, melamine, epoxy and polyurethane resins.

For example, non-limiting examples of common coating binders useful in the present invention include silicon containing polymers, fluorinated polymers, unsaturated and saturated polyesters, unsaturated and saturated polyamides, polyimides, crosslinkable acrylic resins derived from substituted acrylic esters, e.g. from epoxy acrylates, urethane acrylates, polyester acrylates, polymers of vinyl acetate, vinyl alcohol and vinyl amine. The binder polymers may be co-polymers, polymer blends or composites.

Binder polymers are frequently crosslinked with, for example, melamine resins, urea resins, isocyanates, isocyanurates, polyisocyanates, epoxy resins, anhydrides including maleic anhydride, poly acids, biuret, siloxanes and amines, with or without accelerators.

When a crosslinker is used, the amount of crosslinking agent relative to binder polymer will vary widely depending on the binder and the amount of flexibility desired for the resulting layer. For example, the binder composition may contain up to 50% by weight of crosslinker based on the combined weight of the binder polymer and crosslinker or as little as 0.1%. Generally however, when using a crosslinked binder, the amount of crosslinker will range from about 5% to about 50% based on the combined weight of binder polymer and crosslinker, often from 5 to 40%.

The binder can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlags-gesellschaft, Weinheim 1991.

The binder may be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may also be a mixture of different surface coating resins. Provided the binders are curable binders, they are normally used together with a hardener and/or accelerator.

Examples of coating compositions useful in the invention containing specific binders are:

1. coatings based on cold- or hot-crosslinkable alkyd, acrylate, polyester, polyether, epoxy, caramate or melamine resins or mixtures of such resins,
2. two-component polyurethane coatings based on hydroxyl-containing acrylate, polyester or polyether resins and aliphatic or aromatic isocyanates, isocyanurates or polyisocyanates;
3. one-component polyurethane coatings based on blocked isocyanates, isocyanurates or polyisocyanates which are deblocked during baking, if desired with addition of a melamine resin;
4. one-component polyurethane coatings based on a Tris-alkoxycarbonyltriazine crosslinker and a hydroxyl group containing resin such as acrylate, polyester or polyether resins;
5. one-component polyurethane coatings based on aliphatic or aromatic urethaneacrylates or polyurethaneacrylates having free amino groups within the urethane structure and melamine resins or polyether resins, if necessary with curing catalyst;
6. two-component coatings based on (poly)ketimines and aliphatic or aromatic isocyanates, isocyanurates or polyisocyanates;
7. two-component coatings based on (poly)ketimines and an unsaturated acrylate resin or a polyacetoacetate resin or a methacrylamidoglycolate methyl ester;

8. two-component coatings based on carboxyl- or amino-containing polyacrylates and polyepoxides;
9. two-component coatings based on acrylate resins containing anhydride groups and on a polyhydroxy or polyamino component;
10. two-component coatings based on acrylate-containing anhydrides and polyepoxides;
11. two-component coatings based on (poly)oxazolines and acrylate resins containing anhydride groups, or unsaturated acrylate resins, or aliphatic or aromatic isocyanates, isocyanurates or polyisocyanates;
12. two-component coatings based on unsaturated polyacrylates and polymalonates;
13. thermoplastic polyacrylate coatings based on thermoplastic acrylate resins or externally crosslinking acrylate resins in combination with etherified melamine resins;
14. paint systems based on siloxane-modified or fluorine-modified acrylate resins;
15. polyacrylamides and polyacrylates.

The coating composition can also comprise further components, examples being solvents, pigments, dyes, plasticizers, stabilizers, thixotropic agents, drying catalysts and/or levelling agents. Examples of possible components are those described in Ullmann's Encyclopedia of Industrial Chemistry, 5th Edition, Vol. A18, pp. 429-471, VCH, Weinheim 1991.

Possible drying catalysts or curing catalysts are, for example, organometallic compounds, amines, amino-containing resins and/or phosphines. Also, acids and acid-containing resins.

Examples of organometallic compounds are metal carboxylates, especially those of the metals Sn, Pb, Mn, Co, Zn, Zr or Cu, or metal chelates, especially those of the metals Sn, Zn, Al, Ti or Zr, or organometallic compounds such as organotin compounds, for example.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers. Amine catalysts may also be latent or blocked amines.

The curing catalyst used can also be a phosphine, for example triphenylphosphine.

Examples of acid catalysts include organic and inorganic acid catalysts which may also be blocked or latent acids. Examples of organic acids include sulfonic acid catalysts, blocked sulfonic acid catalysts, carboxylic acids, phosphorous acid, blocked phosphorous acid, phosphonic acid, acid phosphates, triflic acid, etc. The class of acid catalysts includes both strong and weak acids.

Blocked, or latent, acid catalysts may be blocked with a volatile amine, oxime, or other agent Examples of inorganic acid catalysts include hydrochloric acid, nitric acid.

The coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form. Where the system is UV-curing, it generally contains a photoinitiator as well. Corresponding systems are described in the abovementioned publication Ullmann's Encyclopedia of Industrial Chemistry, 5th Edition, Vol. A18, pages 451-453. In radiation-curable coating compositions, the novel stabilizers can also be employed without the addition of sterically hindered amines.

The coating may also be a radiation-curable, solvent-free formulation of photopolymerisable compounds. Illustrative examples are mixtures of acrylates or methacrylates, unsaturated polyester/styrene mixtures or mixtures of other ethylenically unsaturated monomers or oligomers.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

The binder polymer is, for example, selected from acrylate, acrylamide polyether, polyester, polyamide, polyurethane, polyolefin, polyvinyl alcohol, epoxy and fluoropolymer resins including co-polymeric resins, for example, acrylates, polyethers, polyesters and polyvinyl alcohols, for example, acrylates, polyethers and polyesters, including crosslinked polymers such as crosslinked systems comprising any of the preceding resins, for example any of the preceding resins crosslinked with melamine, an isocyanates, an aldehyde, aldehyde equivalent or polyaldehyde, a polyalcohol, polyamine or polyalcohol or polyamine functionalized with acrylic acid or methacrylic acid, an isocyante, For example an acrylate, polyether or polyester crosslinked with melamine or an isocyanate.

In one embodiment of the invention the binder polymer is neither electrically conducting nor ionically conducting, for example, a crosslinked or non-crosslinked acrylate or polyester.

In one embodiment of the invention the non-electrically conducting binder polymer is ionically conducting, for example, a crosslinked or non-crosslinked polyether or a crosslinked or non-crosslinked polymer comprising polymer segments along with ester, amide or urethane moieties.

In one embodiment, the binder polymer is part of water born coating, that is a polymer that is water soluble or present in water as a latex or dispersion. For example, a polyacrylate, polyacrylamide, polyester or polyvinyl alcohol solution, latex or dispersion, for example, a polyacrylate, polyacrylamide or polyester solution, latex or dispersion, for example, a polyacrylate solution or dispersion.

The different polymers of the invention are combined using any standard processing steps for polymer resins and coating formulations. For example, the electrochromic polymer and binder polymer be dry blended or dissolved in a solvent or solvents. In one embodiment, water or an aqueous mixture is the solvent. A solution or dispersion of one polymer may be mixed with a solution or dispersion of another, or one polymer as a single component may be blended with a solution or dispersion of another polymer.

It is also possible to further process the polymer blend using techniques common in thermoplastic processing such as extrusion, compression molding, Brabender melt processing, other molding and film forming processes etc.

Typically however, the polymer blend will be mixed and incorporated into the electrochromic device using techniques practiced in coatings technology, for example, the preparation of a coating formulation that comprises a solution or dispersion of the polymers in a solvent which is then applied to the appropriate component of the electrochromic devise, for example, the surface of an electrode by spraying e.g., via air brush, spin coating, drop coating, drawdown, brushing, dipping or any other standard coating application technique. Ink jet techniques can also be used in applying the composition of the invention.

If crosslinking of the binder polymer is desired, the crosslinking can take place at any point in the process, for example, an already crosslinked polymer may be used in the initial dispersion or in preparing the coating formulating, or the polymer may be crosslinked after application of the coating formulation to the desired component of the electrochromic device.

The concentration of the polymers in the thus prepared coating formulation may be somewhat more dilute than typically encountered in standard coating operations due to the stringent demands on the resulting film quality and the physical properties of the electrochromic polymer.

The coating formulation containing the electrochromic polymer and the binder polymer may also be applied in the form of a slurry or powder.

Drying or curing the coating formulation after application to the appropriate component of the electrochromic devise can be accomplished by any standard means appropriate to the formulation components, for example, simply allowing the applied formulation sit at room temperature under standard environmental conditions, heating may be applied, reduced pressure may be used, exposing the formulation to electrochemical radiation, application of a further curing agent or catalyst etc.

More than one binder polymer or electrochromic polymer may be present in the thus formed blend.

The relative amount of cathodically coloring polymer and binder polymer can vary widely, for example 1:99 to 99:1, however, the amount of binder polymer is generally at least 10%. For example, the ratio of electrochromic polymer to binder polymer is from about 5:95 to about 95:5, or from about 10:90 to 90:10, for example from about 20:80 to about 80:20 for example, 40:60 to 60:40, or 50:50.

Because of the surprising efficiency and performance of the electrochromic compositions of the invention, compositions containing higher amounts of binder polymer are readily used. For example, excellent results are achieved using a ratio of electrochromic polymer to binder polymer of from about 1:99 to about 50:50, or from about 5:95 to about 50:50, for example from about 10:90 to about 50:50, for example from about 20:80 to about 50:50.

In one embodiment of the invention the amount of binder polymer exceeds the amount of electrochromic polymer, for example the composition comprises more than 50%, for example 55% or more, or 60% or more, for example 75% or more, or 90% or more or 95% or more of binder polymer relative to the total amount of electrochromic and binder polymer. Excellent results are achieved with ratios of cathodically coloring polymer to binder polymer of 25:75 to 50:50. All ratios are weight:weight ratios.

Specific embodiments of the invention therefore include:

An electrochromic device comprising a cathodically coloring electrochromic composition with excellent color characteristics and durability, which composition comprises an electrically active, cathodically coloring polymer, for example a polymer or copolymer comprising repeat units derived from thiophene containing monomers, and a non-electrically conductive binder polymer in a single layer, wherein the binder polymer is selected from crosslinked or non-crosslinked acrylate, acrylamide, polyester, polyamide, polyurethane, polyolefin, polyvinyl alcohol, epoxy and fluoro polymers, for example crosslinked or non-crosslinked acrylate, acrylamide, polyester and polyvinyl alcohol polymers, wherein the weight ratio of cathodically coloring polymer to binder polymer is from 1:99 to 99:1, typically from about 10:90 to about 90:10, often from about 20:80 to 60:40.

The above electrochromic device wherein the cathodically coloring polymer in the composition is a polymer or copolymer comprising repeat units derived from alkoxy, dialkoxy or alkylenedioxy substituted thiophene containing monomers or the above device wherein the cathodically coloring polymer comprises in its backbone alkoxy, dialkoxy or alkylenedioxy substituted thiophene moieties plus moieties containing other heterocycles.

A device comprising the above described layers wherein the non-electrically conductive binder polymer is also non-ionically conductive and a device comprising the above described layers wherein the non-electrically conductive binder polymer is ionically conductive.

A method for preserving breadth of color space and/or intensity of color strength of an cathodically coloring electrochromic composition comprising an cathodically coloring polymer in an electrochromic device, which method comprises blending the cathodically coloring polymer, for example, a polymer or copolymer comprising repeat units derived from thiophene containing monomers, with a non-electrically conducting binder polymer selected from crosslinked or non-crosslinked acrylate, acrylamide, polyether, polyester, polyamide, polyurethane, polyolefin, polyvinyl alcohol, epoxy and fluoro polymers, typically crosslinked or non-crosslinked acrylate, acrylamide, polyester and polyvinyl alcohol polymers prior to incorporating the composition as part of a single layer into the device, particularly a method wherein the binder polymer is obtained and blended with the cathodically coloring polymer as an aqueous solution, latex or dispersion.

When using an electrochromic polymer alone, there are often physical limits as to how thick a film one can produce, as well as performance limits relating to film build. For example, switching can become very inefficient when using thicker films made of electrochromic polymers. Both of these issues are addressed by the present invention.

For example, coherent films of greater than 1 micron that are durable, adhesive and/or have sufficiently rapid switching speeds are difficult to prepare using certain electrochromic polymers alone and unformulated, such as many thiophene co-polymers including dialkoxy thiophene copolymers like alkylenedioxythiophene copolymers.

One advantage of the invention is that mixing the binder polymer with the electrically active, and generally more expensive cathodically coloring polymer, allows one to produce a more robust and adherent film than films of the cathodically coloring polymer alone. It is also possible to produce thicker films wherein more electrochromic polymer can be incorporated into the film than when using the electrochromic polymer alone. For example, it may be possible to produce effective films of certain electrochromic polymers of 0.1 to 0.5 micron or less, however, the present invention allows one to prepare, for example, an effective film that is more than 1 micron thick, often much more than 1 micron thick comprising 50% or more of the electrochromic polymer.

More than one color can be obtained by varying the voltage applied to the polymer. That is, in many systems comprising the cathodically coloring polymers, different hues are obtained at different voltages.

Significantly, the color space and color strength of the inventive blend is maintained much longer than when using the cathodically coloring polymers alone, that is, the color changing characters of the inventive blend are far more durable after repeated switching.

The compositions of the present invention maintain the quick switching speeds of the electrochromic polymer when used alone. Notably, the present invention allows for rapid switching even when using thicker film builds, which, as mentioned above, is often problematic when using the electrochromic polymer alone. The compositions are therefore ideal for use in electrochromic devices.

A simple electrochromic device of the invention comprises, for example, at least the following elements:
i) an electrode
ii) an cathodically coloring electrochromic composition of the invention
iii) an electrolyte
iv) optionally a second electrochromic composition
v) an electrode.

The present cathodically coloring compositions may be the only color changing component of the device or additional layer or layers comprising other electrochromic compositions may be present. For example, in a device, a second electrochromic composition may be present as a separate anodically coloring layer associated with electrode opposite the electrode associated with the inventive cathodically coloring composition. Thus, each electrode has a complimentary electrochromic material associated with it and the combined combination of colors can be advantageously used to garner maximum color range or contrast and/or opacity upon application of voltage. The electrochromic component in the second optional electrochromic composition can be any inorganic or organic composition employed in the art. In one embodiment the opposite anodically coloring composition comprises an electrochromic polymer, for example, a poly(dialkoxypyrrole), for example a N-substituted poly(alkylenedioxypyrrole).

In one embodiment of the invention, a device with the above architecture wherein each electrode has a complimentary electrochromic material associated, the cathodically coloring polymer may be blended with a non-coloring or low coloring electroactive material, in addition to or instead of the non-electrically conductive binder polymer. For example a cathodically coloring polymer may be blended with a non-color changing electro-active polymer such as a polymer comprising cyclic nitroxyl groups, or active nitrile based materials. The non-coloring materials may have some slight color, but do not impact the color of the device, for example, TEMPO and its derivatives may be used, for example a polymer comprising 4-acryloxy or 4-methacryloxy TEMPO monomer units may be used.

Specific embodiments include an electrochromic device comprising a cathodically coloring electrochromic composition, which composition comprises an electrically active, cathodically coloring polymer, such as a polymer or copolymer comprising repeat units derived from thiophene containing monomers, and a non-coloring electroactive polymer in a single layer, which layer may also contain a binder polymer as described herein and an electrochromic device as above, which also comprises an anodically coloring component associated with a counter electrode, for example, wherein the anodically coloring component comprises an electroactive, anodically coloring polymer, such as an alkoxy or dialkoxy substituted pyrrole polymer.

The invention therefore provides for more robust cathodically coloring polymer compositions with greater adhesion to surfaces such as electrodes, provides for more durable electrochromic devises, allows for a wider choice of polyelectrolyte in the electrochromic device comprising a cathodically coloring polymer and allows for more flexibility in the design of electrochemical devices.

EXAMPLES

In the following examples, Polymer CC1, prepared according to US Pat. Appl. Pub. no. 2010/0298527 is of general formula:

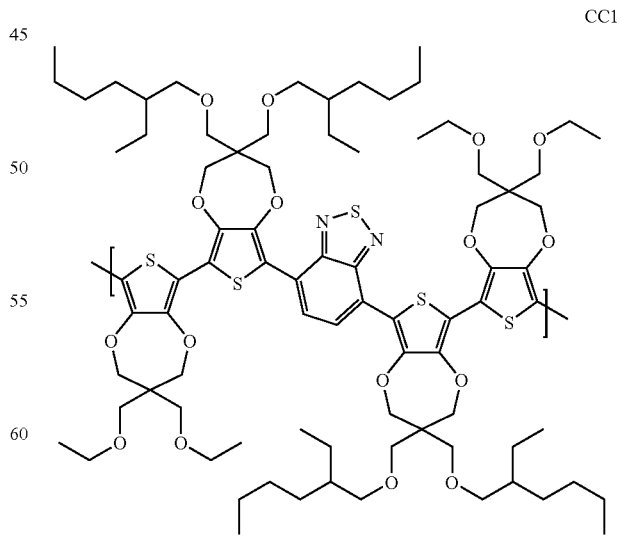

CC1

Polymer CC2, prepared according to US Pat. Appl. Pub. No. 2011/0046330 is of general formula:

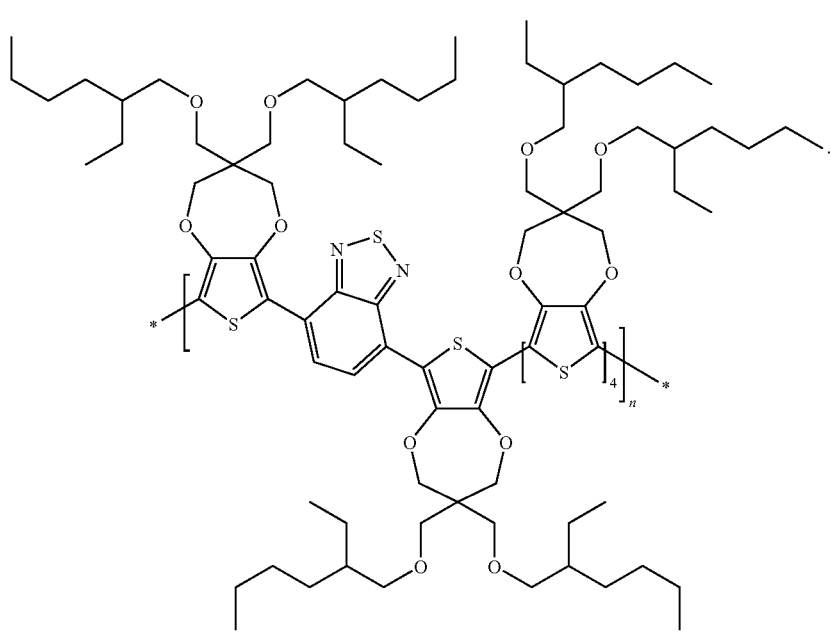

CC2

Electrochromic layers consisting of neat cathodically coloring polymers, "unformulated films" and layers consisting of the cathodically coloring polymers blended with binder polymers according to the invention, "formulated films", are prepared on indium tin oxide (ITO) coated glass slides and tested in rudimentary electrochromic devices as described below.

Example 1

Unformulated CC1 Film

A polymer with the general formula CC1 is dissolved in toluene at a concentration of approximately 0.60-0.65% by weight. The solution is stirred for several hours to ensure solubilization. The polymer solution is sprayed onto a clean 7 mm×20 mm ITO-coated glass slide of low resistivity (e.g. Delta Technologies C-G-501N-CUV). The solvent is allowed to evaporate at ambient temperature until the film is set, and then the coated slide is annealed at from 120 to 140° C. under atmospheric conditions, for 30 minutes.

Example 2

Formulated CC1 Film

An approximately 0.60-0.65% by weight solution of the electrochromic polymer of formula CC1 in toluene is prepared as in Example 1. To the solution is added a hydroxyl functional acrylic copolymer (75% active solids, hydroxyl equivalent weight=500) and an alkoxylated methyl melamine (RESIMENE 755) to prepare a solution containing electrochromic polymer, acrylic copolymer and alkoxylated methyl melamine in a weight ratio of 5:3:2. The resulting solution is stirred for several hours after which dodecyl benzene sulfonic, 10% by weight based on the combined weight of acrylic copolymer and alkoxylated methyl melamine is added with stirring and the mixture sprayed onto an ITO coated slide, dried and annealed as in example 1.

Example 3

Unformulated CC2 Film

The procedure of Example 1 is repeated using a polymer with the general formula CC2 in place of the polymer CC1.

Example 4

Formulated CC2 Film

The procedure of Example 2 is repeated using a polymer with the general formula CC2 in place of the polymer CC1.

Example 5

Electrochromic Performance

The coated slides from Examples 1 and 2 are placed in a rudimentary device comprising a quartz cuvette equipped with a Teflon top that allows the secure positioning of the coated ITO slide, a platinum wire coil counter electrode, and a reference electrode. A 0.1M solution of $LiCLO_4$ in propylene carbonate as electrolyte is added. The polymer coated slides are first soaked for 30 minutes in the electrolyte solution and then subjected to conditioning by cyclic voltammetry using scan rates of 10 millivolts per second until the cyclic voltammograms overlap with repeated cycling.

Each of the slides are then subjected to a continuous series of potential square waves (PSW), wherein the applied potential is repeatedly alternated between an oxidizing potential and a neutralizing potential. After 1,000 PSW the slides are evaluated for color contrast, physical deterioration and change in electric properties.

After 1,000 Cycles:

The unformulated slide from Example 1 exhibits only a faint color change when subjected to a change in applied potential, a 63% loss in current determined by measuring CVs before & after 1000 PSWs and the film shows visible signs of physical deterioration.

The formulated slide from Example 2 continues to exhibit strong color changes from clear to green with no loss in color or contrast when subjected to a change in applied potential, only a 17% loss in current and the film shows no visible signs of physical deterioration.

Example 6

The procedures of Example 5 are repeated using the slides of Example 3 and 4. After 1,000 PSWs the unformulated slide from Example 3 exhibits loss in color change ability and current similar to that of the slide form Example 1 with similar physical deterioration while the formulated slide from Example 4 continues to exhibit color changes from very light gray to black with no loss in color or contrast, a very small loss in current and the film shows no visible signs of physical deterioration.

The invention claimed is:

1. An electrochromic device comprising a cathodically coloring electrochromic composition with excellent color characteristics and durability, which composition comprises an electrically active, cathodically coloring polymer and a non-electrically conductive binder polymer in a weight ratio of cathodically coloring polymer to binder polymer of from about 1:99 to about 99:1, wherein the binder polymer is selected from crosslinked or non-crosslinked acrylate, acrylamide, polyester, polyimide, polyurethane, polyolefin, polyvinyl alcohol, epoxy and fluoro polymers and
wherein the cathodically coloring polymer is of formula II $$*-Z_q-\underset{S}{\overset{R^{10}\ R^{11}}{\underset{O\quad O}{\bigcirc}}}-E_r-X-E_r-\underset{S}{\overset{R^{12}\ R^{13}}{\underset{O\quad O}{\bigcirc}}}-Z_q-* \qquad \text{II}$$

wherein X is an electron poor aromatic unit selected from substituted or unsubstituted benzothiadiazole, thiadiazoloquinoxaline, quinoxaline, thienothiadiazol, thienopyrazine, pyrazinoquinoxaline, benzobisthiadiazole and thiadiazolothienopyrazine;
E is a substituted or unsubstituted thiophene;
Z is a substituted or unsubstituted dioxythiophene;
q and r are 0, 1, 2 or 3 and
$R^{10}$, $R^{11}$, $R^{12}$ and $R^{13}$ are the same or different and are a linear or branched aliphatic carbon chain that optionally comprises one or more heteroatoms.

2. An electrochromic device according to claim 1, where in the cathodically coloring polymer $R^{10}$, $R^{11}$, $R^{12}$ and $R^{13}$ are —R'OR" groups where R' is methylene, ethylene or propylene and R" is a linear or branched $C_2$ to $C_{30}$ alkyl.

3. An electrochromic device according to claim 1, where X is unsubstituted benzathiadiazole.

4. An electrochromic device according to claim 1, where in the cathodically coloring polymer $R^{10}$, $R^{11}$, $R^{12}$ and $R^{13}$ are —R'OR" groups where R' is methylene, ethylene or propylene and R" is a linear or branched $C_2$ to $C_{30}$ alkyl and X is unsubstituted benzathiadiazol.

5. An electrochromic device according to claim 1, wherein the binder polymer is selected from crosslinked or non-crosslinked acrylate, acrylamide, polyester and polyvinyl alcohol polymers.

6. An electrochromic device according to claim 1 wherein the binder polymer is obtained and blended with the cathodically coloring polymer as an aqueous solution, latex or dispersion.

7. An electrochromic device according to claim 1 wherein the non-electrically conductive binder polymer is also non-ionically conductive.

8. An electrochromic device according to claim 1, which also comprises an anodically coloring component.

9. An electrochromic device according to claim 8, wherein the anodically coloring component comprises an electroactive, anodically coloring polymer.

10. An electrochromic device according to claim 9, wherein the anodically coloring component comprises an alkoxy or dialkoxy substituted pyrrole polymer.

11. An electrochromic device according to claim 1, wherein the cathodically coloring composition also comprises a non-coloring electroactive polymer.

12. A method for preserving breadth of color space and/or intensity of color strength of an cathodically coloring electrochromic composition comprising an cathodically coloring polymer, which method comprises blending the cathodically coloring polymer with a non-electrically conducting binder polymer prior to incorporation as a single layer into an electrocromic device, wherein the binder polymer is selected from crosslinked or non-crosslinked acrylate, acrylamide, polyether, polyester, polyamide, polyurethane, polyolefin, polyvinyl alcohol, epoxy and fluoro polymers and
wherein the cathodically coloring polymer is of formula II $$*-Z_q-\underset{S}{\overset{R^{10}\ R^{11}}{\underset{O\quad O}{\bigcirc}}}-E_r-X-E_r-\underset{S}{\overset{R^{12}\ R^{13}}{\underset{O\quad O}{\bigcirc}}}-Z_q-* \qquad \text{II}$$

wherein X is an electron poor aromatic unit selected from substituted or unsubstituted benzothiadiazole, thiadiazoloquinoxaline, quinoxaline, thienothiadiazol, thienopyrazine, pyrazinoquinoxaline, benzobisthiadiazole and thiadiazolothienopyrazine;
E is a substituted or unsubstituted thiophene;
Z is a substituted or unsubstituted dioxythiophene;
q and r are 0, 1, 2 or 3 and
$R^{10}$, $R^{11}$, $R^{12}$ and $R^{13}$ are the same or different and are a linear or branched aliphatic carbon chain that optionally comprises one or more heteroatoms.

13. A method according to claim 12, where in the cathodically coloring polymer $R^{10}$, $R^{11}$, $R^{12}$ and $R^{13}$ are —R'OR" groups where R' is methylene, ethylene or propylene and R" is a linear or branched $C_2$ to $C_{30}$ alkyl and X is unsubstituted benzathiadiazole.

14. A method according to claim 12, wherein the binder polymer is selected from crosslinked or non-crosslinked acrylate, acrylamide, polyester and polyvinyl alcohol polymers.

15. A method according to claim 12 wherein the binder polymer is obtained and blended with the cathodically coloring polymer as an aqueous solution, latex or dispersion.

* * * * *